Feb. 23, 1965 G. L. BAUER 3,170,650
WIRE SPOOLING APPARATUS AND METHOD
Filed Dec. 27, 1961 7 Sheets-Sheet 3
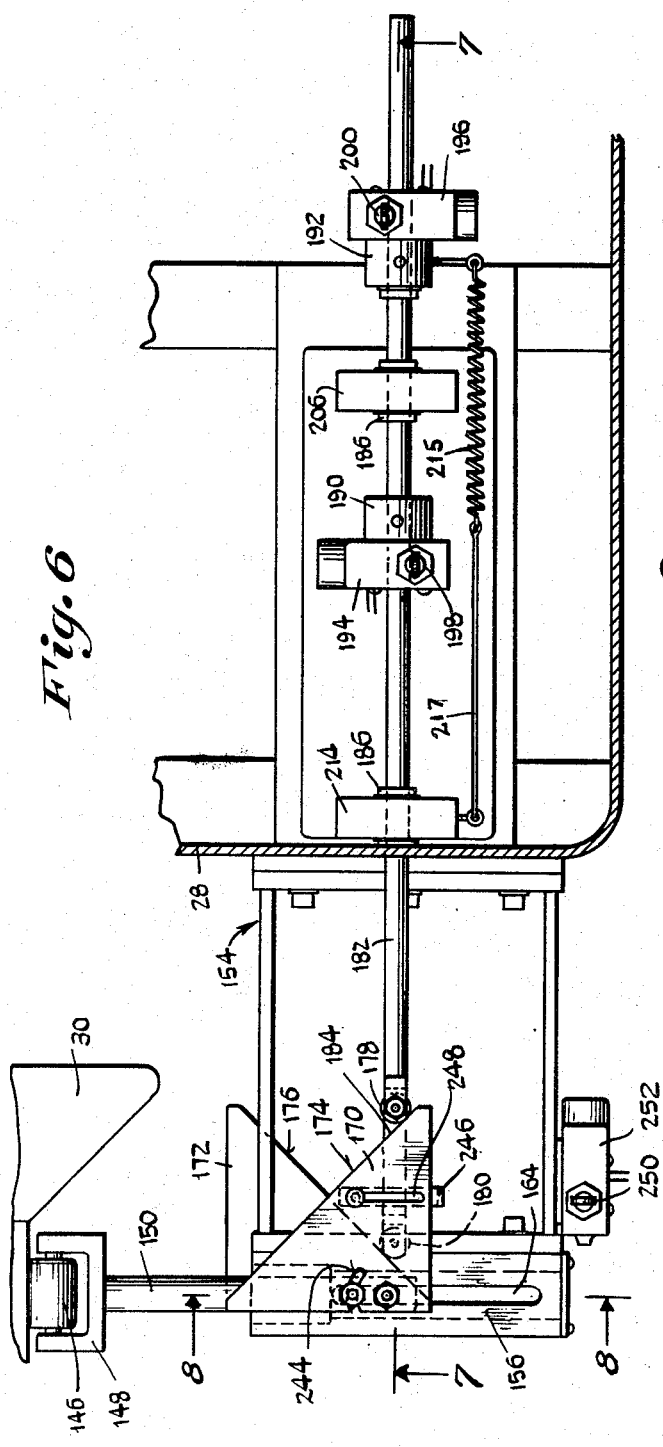
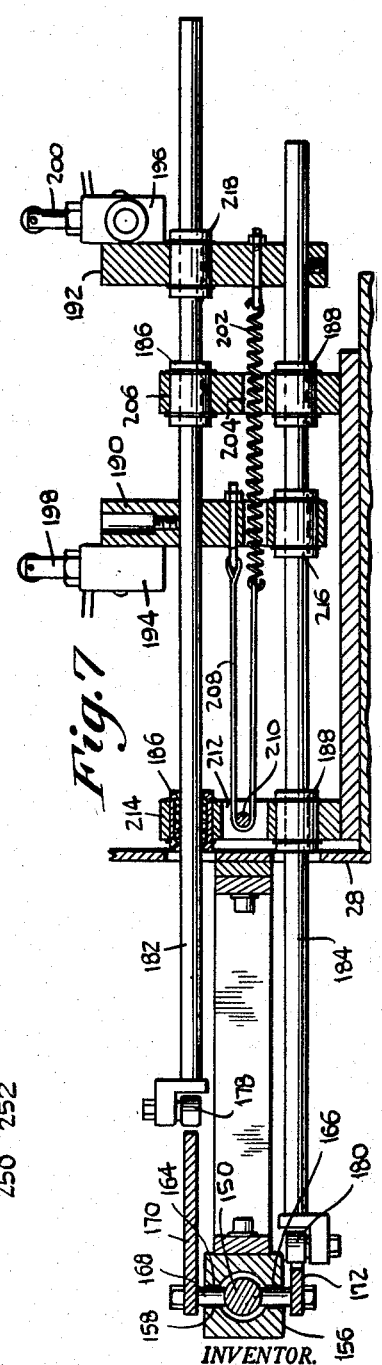
INVENTOR.
Gordon L. Bauer
BY
AGENT

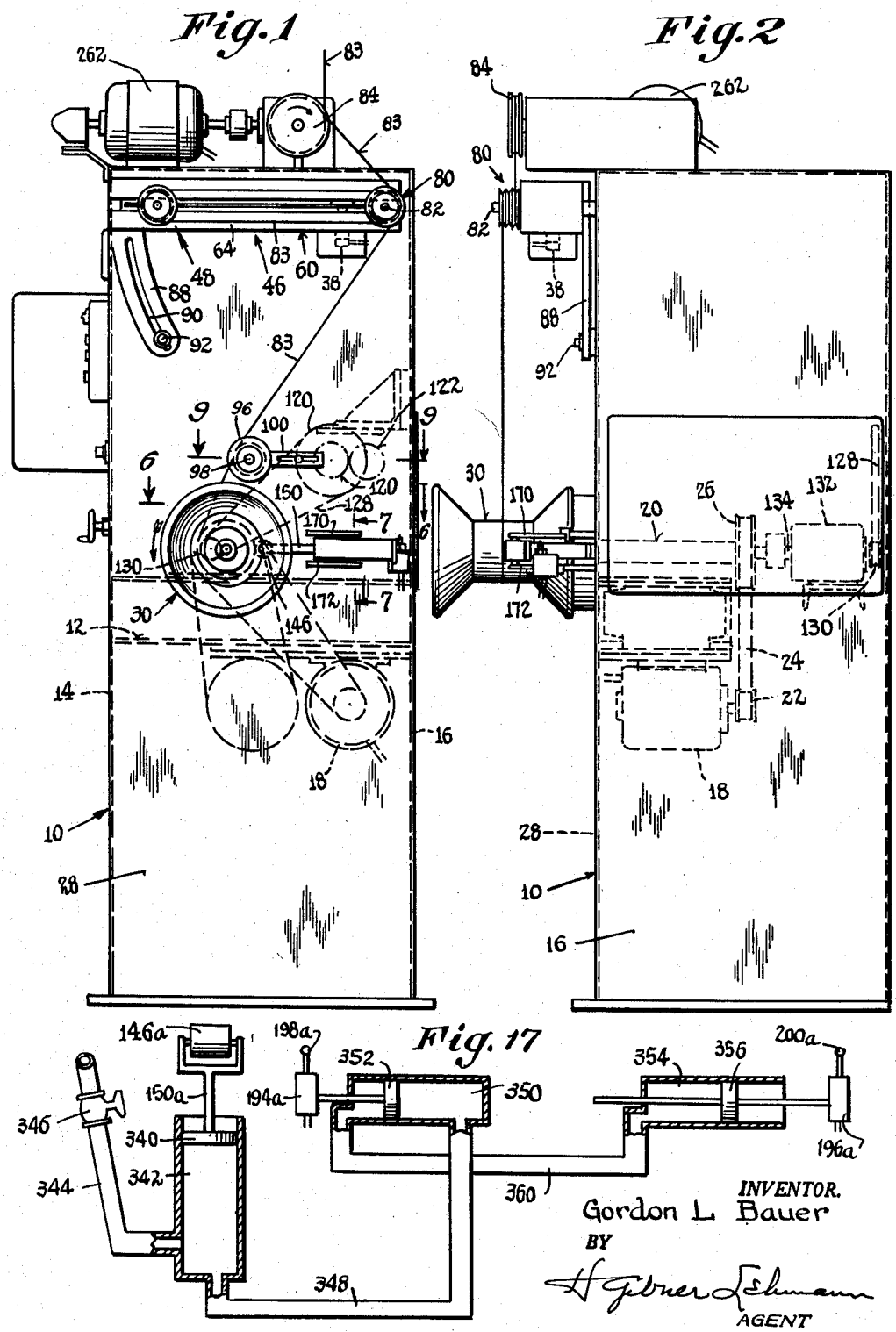

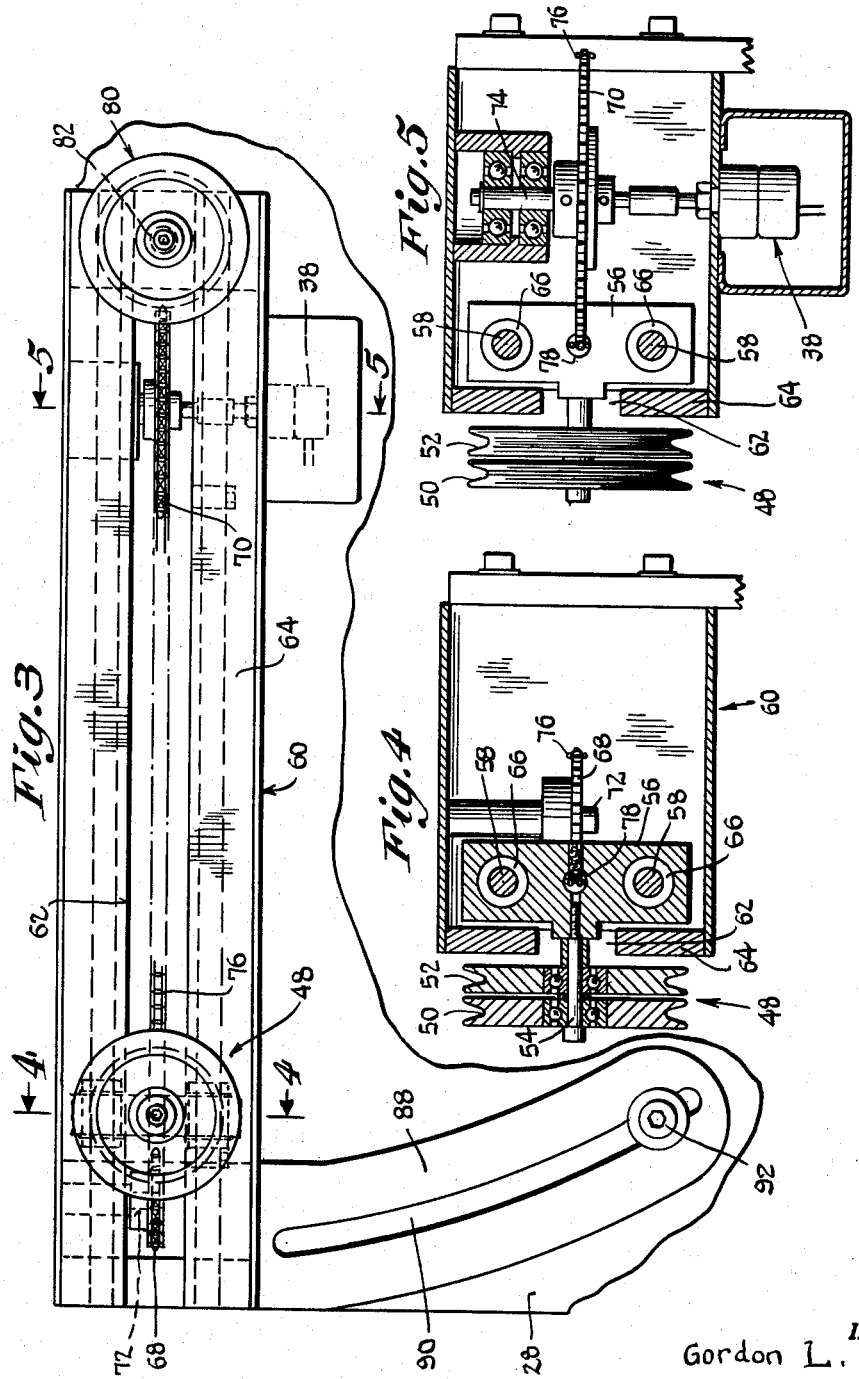

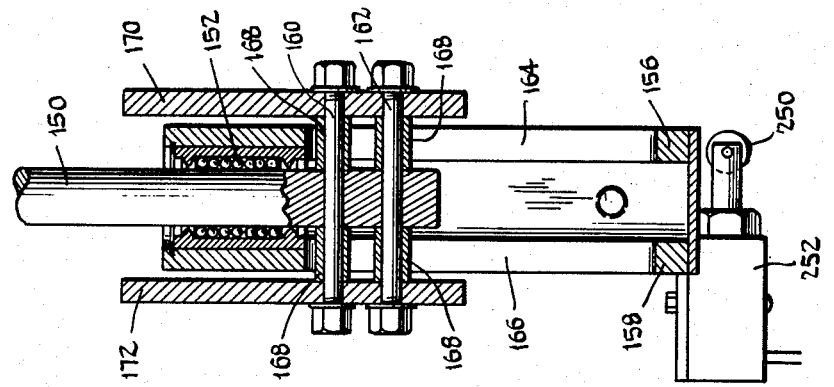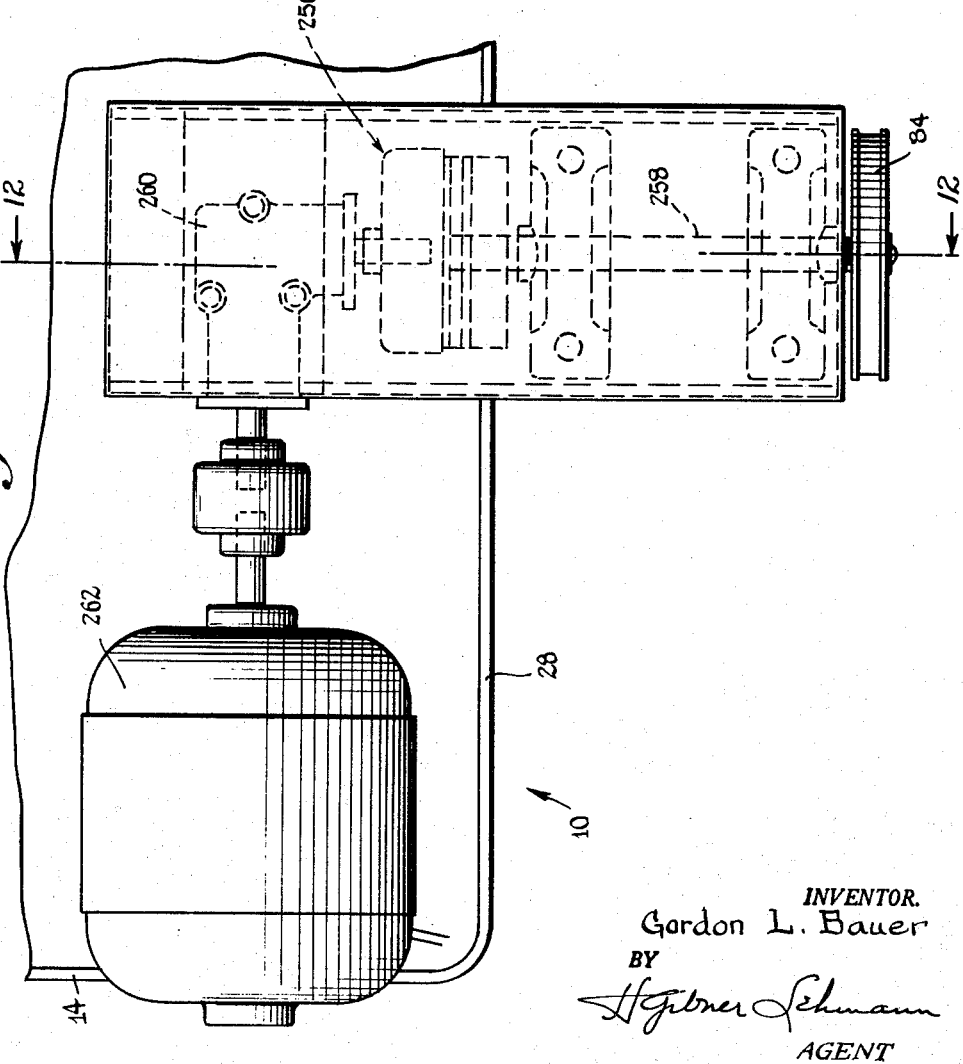

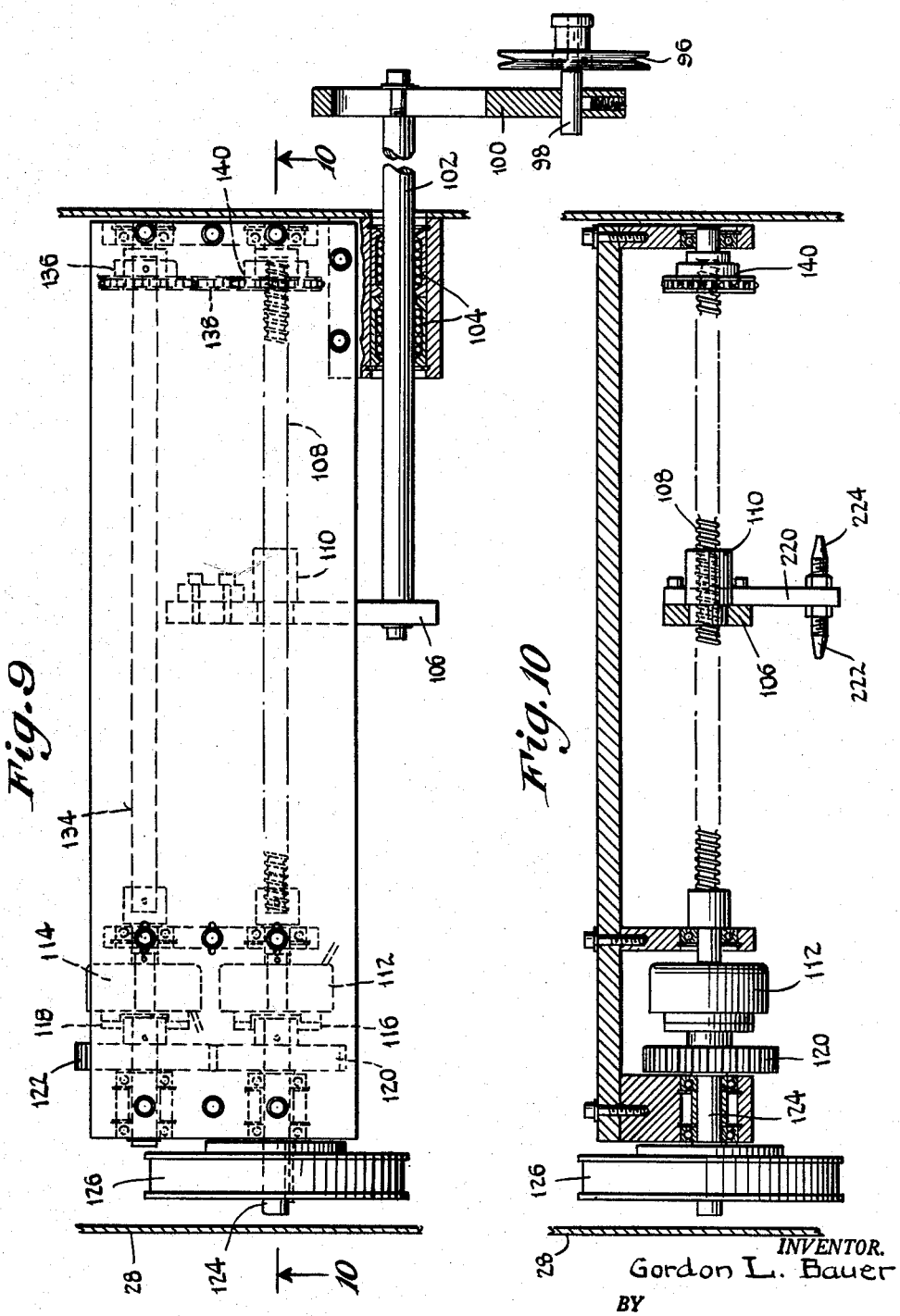

Feb. 23, 1965        G. L. BAUER        3,170,650
WIRE SPOOLING APPARATUS AND METHOD
Filed Dec. 27, 1961        7 Sheets-Sheet 6
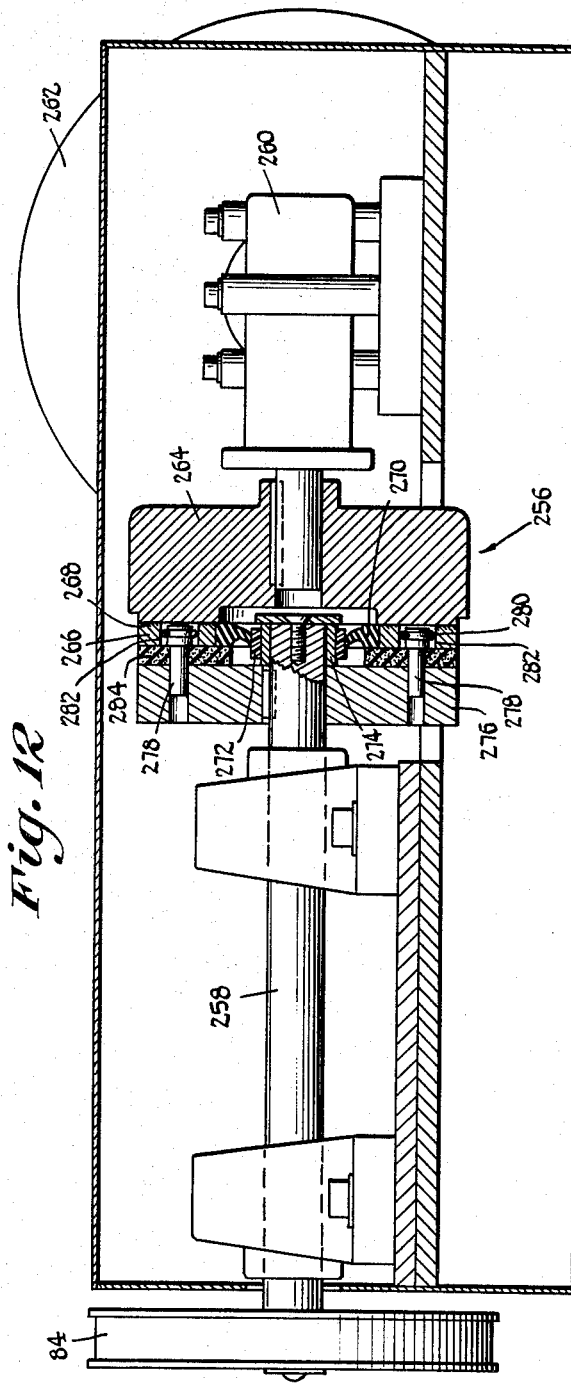
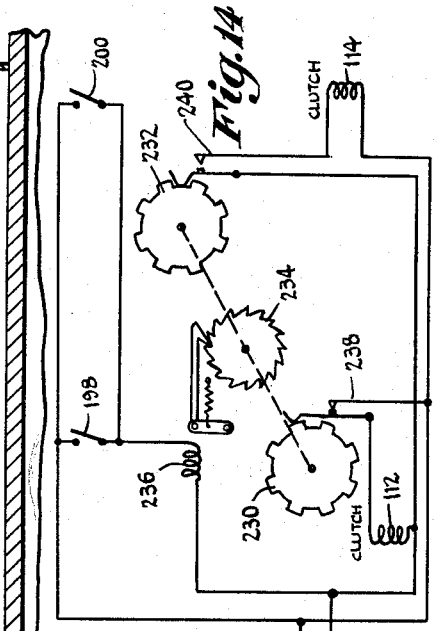
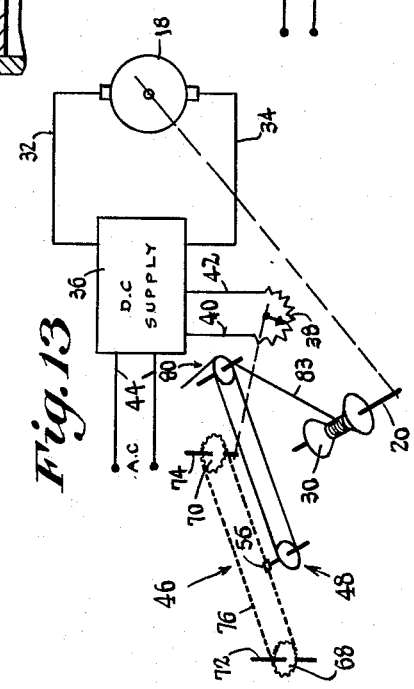
INVENTOR.
Gordon L. Bauer
BY
AGENT Feb. 23, 1965         G. L. BAUER              3,170,650
              WIRE SPOOLING APPARATUS AND METHOD
Filed Dec. 27, 1961                          7 Sheets-Sheet 7
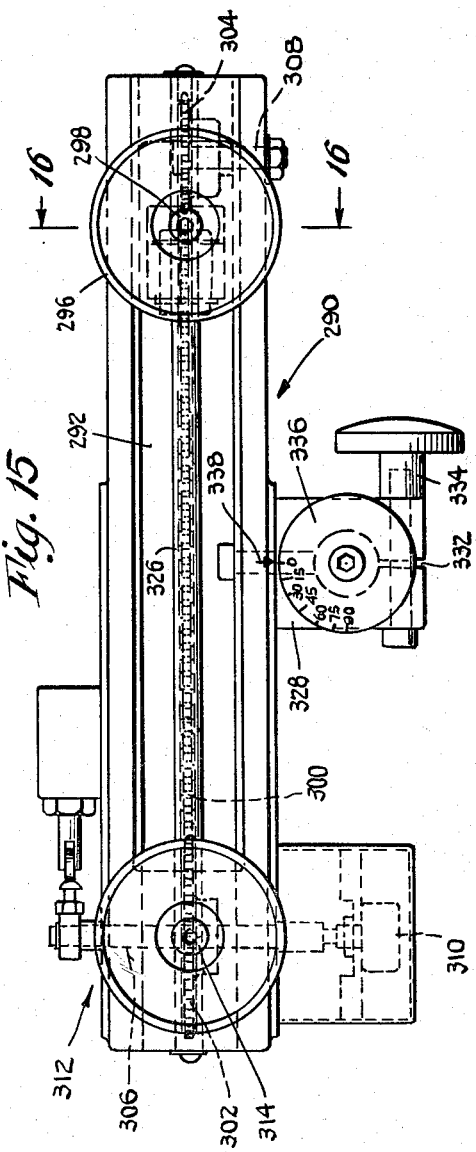
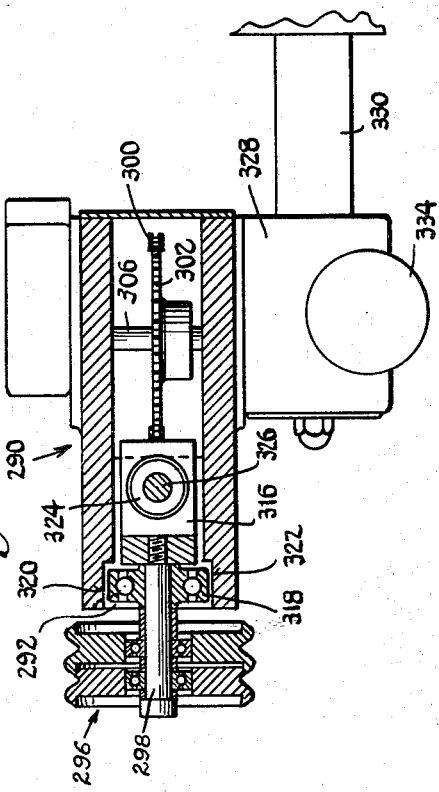
INVENTOR.
Gordon L. Bauer
BY
AGENT

United States Patent Office 3,170,650
Patented Feb. 23, 1965

3,170,650
WIRE SPOOLING APPARATUS AND METHOD
Gordon L. Bauer, Shelton, Conn., assignor to Advanced Wyrepak Company, Incorporated, Bridgeport, Conn., a corporation of Connecticut
Filed Dec. 27, 1961, Ser. No. 162,353
26 Claims. (Cl. 242—25)

This invention relates to wire spooling, and more particularly to power-operated spooling equipment adapted to wind appreciable quantities of fine and coarse wire on a single spool, and to methods for doing the same.

Heretofore, in the spooling of wire, definite limitations were encountered with regard to the fineness of the wire which could be spooled and the speed of spooling and winding, where relatively large amounts of wire are to be placed on a single spool.

The problems involved with small wire size and high speeds are not in general troublesome where small quantities of wire, up to about ten pounds or so, are handled. However, when the quantities to be placed on a single spool run from 50 lbs. to 100 lbs. and over, no satisfactory simple and effective method or equipment exists in the prior art to make possible high winding speeds and minimum breakage.

The present invention provides improvements in wire winding and spooling whereby the above limitations are appreciably rolled back or reduced, and accordingly one object of the invention is to provide a novel and improved apparatus and method by which a relatively large quantity of very fine wire may be effectively and reliably spooled while minimizing the likelihood of its breakage.

A further object of the invention is to provide an improved apparatus and method in accordance with the foregoing, wherein fine wire in the large quantities mentioned may be rapidly spooled without breakage, thereby reducing the spooling time to a desirable minimum and increasing the rate of production.

In accomplishing these objects, the invention provides improved tension-control means for wire-spooling equipment, by which the wire tension is reliably held uniform and constant, this being effected by a novel dancer construction characterized by a pulley assembly movable along a track arranged to be inclined with respect to the vertical and wherein the inclination of the track may be changed or adjusted to vary and lighten or increase the tension of the wire passing over the pulleys.

Another object of the invention is to provide an improved wire-spooling machine as above outlined, wherein adjustment of the dancer construction is facilitated, such adjustment being effected easily and quickly.

A feature of the invention resides in the provision of an improved spooling machine as set forth, wherein indications are readily had as to the inclination of the dancer construction and the wire tension effected thereby.

In accomplishing the above the invention provides a centralized pivot for the dancer construction to effect substantially a balance between two portions thereof whereby the effect of gravity on the adjustment is nullified. Further, a graduated dial is provided at the said pivot, for cooperation with an index mark to idicate the extent or degrees of inclination of the track portion of the dancer. Thus, easy and quick, accurate positioning of the dancer may be had.

Yet another object of the invention is to provide a novel wire spooling apparatus and method as above characterized, in conjunction with spools of the type having tapered ends, wherein the wire is smoothly and evenly laid in place despite the end taper of the spools.

In effecting this, there is provided by the invention an improved combination including a reciprocable traverse device having a path of travel which is increased automatically as the wire builds up on the spool and a follower mechanism and control which is responsive to the increase in the diameter of the quantity of wire being wound.

The invention further provides a novel and improved combination of this type wherein the control comprises hydraulic motive units effecting an advantageous flexibility as regards disposition and arrangement of the control components.

A still further object of the invention is to provide, in a spooling apparatus of the type set forth, an improved smooth-acting clutch and capstan device especially adapted to the handling of fine wire at the start of the spooling of the same.

A feature of the invention resides in the provision of an improved apparatus and method for accomplishing the above objects, which is simple and reliable, the apparatus involving relatively few components and being economical to construct and fabricate.

Other features and advantages will hereinafter appear.

In the drawings, illustrating the embodiment of the invention, similar characters of reference are used to designate like components throughout the several views, in which:

FIG. 1 is a front elevational view of the improved wire spooling machine as provided by the invention.

FIG. 2 is a side elevational view of the machine shown in FIG. 1.

FIG. 3 is a fragmentary view or detail of the dancer assembly portion of the machine, which is seen in FIG. 1 as being located on the upper front casing portion.

FIG. 4 is a transverse sectional view, taken on the line 4—4 of FIG. 3.

FIG. 5 is a transverse sectional view taken on the line 5—5 of FIG. 3.

FIG. 6 is a fragmentary horizontal sectional view through the machine, taken on the line 6—6 of FIG. 1, showing details of the automatic traverse control mechanism.

FIG. 7 is a fragmentary vertical sectional view taken on the line 7—7 of FIG. 6; also on the line 7—7 of FIG. 1.

FIG. 8 is a fragmentary vertical sectional view, taken on the line 8—2 of FIG. 6.

FIG. 9 is a fragmentary horizontal sectional view, taken on the line 9—9 of FIG. 1, showing the main portion of the traverse mechanism.

FIG. 10 is a fragmentary vertical sectional view, taken on the line 10—10 of FIG. 9.

FIG. 11 is a fragmentary top plan view of the spooling machine, illustrating the capstan and drive therefor.

FIG. 12 is a vertical sectional view, taken on the line 12—12 of FIG. 11.

FIG. 13 is a diagrammatic representation of the spindle power drive and the dancer pulley assemblage for effecting automatic control thereof.

FIG. 14 is a schematic circuit diagram showing a simplified electric control involved with the traverse structure.

FIG. 15 is a front elevational view of a modified form of novel dancer construction as provided by the invention, involving a centralized pivot and dial indiactor for inclination.

FIG. 16 is a fragmentary transverse sectional view, taken on the line 16—16 of FIG. 15.

FIG. 17 is a diagrammatic representation of a modified form of automatic traverse control mechanism as provided by the invention.

Referring first to FIGS. 1 and 2, the spooling machine is shown as comprising an upright casing 10 of generally rectangular shape, having a transversely supporting structure 12 in its forward portion, extending between the opposite casing sides 14 and 16 and located approximately half way between the casing top and bottom.

Disposed below and carried by the supporting structure 12 is a driving motor 18 for the main spindle 20, the said motor having a driving pulley 22 engaged with a belt 24 which passes over a driven pulley 26 carried by the main spindle. Suitable bearings (not shown in detail) for the main spindle 20 are mounted on the supporting structure 12.

The spindle 20 passes out through the front wall 28 of the casing 10 and carries at its outermost end a bobbin 30, which is driven thereby in a counterclockwise direction as indicated by the arrow in FIG. 1.

Automatic control of the speed of the spindle 20 and spool 30 is effected, in accordance with the invention, in a novel manner which will be described in detail below. A brief explanation will be now given, reference being had to the diagrammatic showing of FIG. 13. In this figure, the spindle driving motor 18 is shown as connected by leads 32 and 34 with a D.C. power supply 36 which may be of any suitable type. Direct current power supplies for this purpose may employ, for example, a tarnsformer unit and rectifier means in the form of vacuum tubes by which the alternating current is transformed into a direct current suitable for energizing the driving motor 18 and for effecting a speed control thereover. The D.C. supply may further include a rheostat or potentiometer unit 38 connected by leads 40 and 42 with the supply, as shown. Varying the potentiometer control 38 will thus effect a change in the speed of the driving motor 18, as is well understood. The D.C. supply unit 36 is connected with the usual A.C. supply mains or lines 44 as shown.

In accordance with the present invention, the spooling machine as shown herein is especially adapted for high-speed winding or spooling of very fine wire, as for example wire on the order of .006 inch diameter (No. 34 B and S gage) at speeds in excess of 1,000 feet per minute, where large quantities of such wire are to be wound on a single spool. Quantities of from 50 lbs, to 100 lbs. and over, for example, may be wound at high speed and without breakage, on one spool. Wire of this small size, where constituted of soft copper which does not have appreciable tensile strength, may in accordance with the invention be successfully spooled at 1,250 feet per minute and higher linear speeds, on spools such as the spool 30 shown in FIGS. 1 and 2 which will carry a very appreciable quantity of such fine wire.

In accomplishing the foregoing, the present improved machine provides for an automatic control in the tension of the wire which is being supplied to the spool 30 to maintain such tension constant and uniform, by effecting an automatic control of the rotative speed of the spool as the quantity of wire builds up on the same, in conjunction with a prime capstan which is driven at a constant speed and which therefore determines the linear speed of the wire (as in feet per minute). The automatic control mechanism provided by the invention is arranged to automatically control or adjust the speed-controlling potentiometer unit 38 which is shown in elevation in FIGS. 1 and 2 and is shown diagrammatically with the connections thereof in FIG. 13.

In effecting such control there is provided by the invention a novel dancer pulley construction which is indicated generally by the numeral 46 in FIGS. 1–3 and 13. The dancer construction 46 comprises a dancer pulley assemblage 48 (see FIGS. 1–5) including a pair of sheaves 50, 52 turnably carried on a spindle 54 which is mounted on a carriage 56 movable along a pair of parallel tracks or guide bars 58. The tracks 58 are carried within an elongate rectangular housing 60 having a longitudinal slot 62 in its front wall 64, through which the spindle 54 extends. As shown, the sheaves or pulleys 50, 52 are disposed at the front, exterior of the housing 60, and by virtue of the carriage mounting therefor, may travel along the slot 62 in either direction toward the opposite end portions of the housing.

Suitable anti-friction bushings 66 may be carried by the carriage 56, to reduce the friction between the same and the tracks or bars 58. Such bushings employ ball bearings and are known commercially as Thompson longitudinal bearing or ball bushings.

Within the two end portions of the housing 60 sprockets 68 and 70 are turnably carried, said sprockets being mounted on shafts 72 and 74 which are parallel to the plane containing the guide bars 58, as seen in FIGS. 4 and 5. A chain 76 passes around the sprockets 68 and 70 and also passes through a hole or bore 78 in the carriage 56 as seen in FIGS. 4 and 5. The chain 76 is secured to the carriage 56 in any suitable manner, and may if desired be adjustably secured with a releasable fastening.

The shaft 74 for the sprocket 70 is directly coupled to the speed-controlled potentiometer unit 38, as clearly shown in FIG. 5. By this organization, when the dancer pulley assemblage 48 shifts along the tracks 58 and slot 62, it will effect a turning of the sprockets 68, 70 and turning of the shaft 74 whereby an adjustment is effected of the potentiometer control 38. In consequence, an adjustment of the speed of the motor 18 and speed of the main spindle 20 of the machine is had, by which there is varied the speed of turning of the spool 30.

The dancer construction further comprises an additional sheave assemblage 80 carried by a spindle 82 which is secured to the upper front portion of the casing 10 as seen in FIG. 2. The wire 83 which is to be wound or spooled passes over and around the pulleys and sheaves of the assemblages 48 and 80 as shown.

In accordance with the present invention, the dancer construction 46 is constituted in a novel manner by which relatively light tension which is always of uniform character may be maintained in the wire 83 as it passes around the pulley and sheave assemblages 48, 80 and to the spool 30, said tension being readily adjustable, all to the end that very fine wire may be handled by the machine and wound in appreciable quantities at a relatively high speed without danger of breakage of the wire even though the tensile strength involved is not great, as in the case of winding soft bare copper wire. In effecting this, the housing 60 of the dancer construction and the track or guide bars 58 are arranged to be pivotally movable or inclined as a unit about the spindle 82 for the sheave assemblage 80.

Referring to FIG. 1, the wire 83 which is being wound on the spool 30 is brought to the sheave assemblage 80 from a prime capstan 84 later to be described, and passes several times around such assemblage and the dancer assemblage 48, whereupon it passes downward over a traverse pulley 96 and thence to the bobbin 30.

The fine, uniform control of the wire tension as provided by the invention is obtained essentially by the pivotal mounting of the track 58 and housing 60 whereby different inclinations thereof with respect to the vertical may be had, thereby to alter the effect of gravity on the dancer pulley assemblage 48. In consequence, such pulley assemblage need not be especially light in weight in order to obtain light wire tensions, since the net effect of gravity on the pulley assemblage, by which the wire tension is obtained, may be readily varied by changing the inclination of track. Further, a slotted arm 88 having an arcuate slot 90 is secured to one end of the housing 60 as seen in FIGS. 1 and 3, such arm being adjustably positioned by means of a fastening bolt 92 passing through the slot 90 and carried by the front wall 28 of the machine base 10.

As seen in FIG. 1, the housing 60 and track 58 of the dancer construction are shown substantially in a horizontal position. For such position the force of gravity will have no component acting on the dancer pulley assemblage 48 which tends to maintain the same separated or apart from the sheave assemblage 80. From the position of FIG. 1 the track and housing 58, 60 may be pivoted in a counterclockwise direction and placed in various adjusted inclined positions as provided for by the slotted arm 88, whereby the net shifting of gravity on the dancer pulley assemblage 48 may be increased due to an increased force component which tends to shift the pulley assemblage downward along the track or guide bars 58 (to the left as viewed in FIGS. 1 and 3). The more that the track and housing assembly 58, 60 is inclined with respect to the horizontal, the greater will be the component of the force of gravity acting on the dancer pulley assemblage 48 in a manner to place the wire 83 being wound on the spool 30 in tension. Such tension in the wire will vary with the sine of the angle which the track bars 58 make with respect to the horizontal. It may have an infinite number of values, varying from no tension to its maximum tension value.

I have found that with the above organization of dancer pulley assemblage, inclined track and cooperable sheave assemblage it is possible at all times to maintain a uniform desired tension in the wire which is being spooled, regardless of the continued build-up of the wire on the spool which causes the diameter of the spooled quantity to increase as the quantity becomes larger. In this connection it should be noted that the linear speed of the wire is controlled by the constant speed of turning of the capstan 84, as will be later further explained.

As already stated above, the tension-controlling action as the dancer construction having the inclined track is pivotally adjusted involves a control of the speed of the spindle 20 and bobbin 30. As the quantity of the wire 83 which is wound on the bobbin 30 becomes greater so that the effective outside diameter of such quantity increases there will be a tendency for the bobbin at any given speed to pull the wire more. This will tend to cause a slight increase in the tension of the wire, and will result in the dancer pulley asesmblage 48 travelling upward along the inclined track, against the force of gravity. Such action will cause a turning of the sprocket 70 and an adjustment of the potentiometer control 38. Thus, an automatic slowing down of the driving motor 18 for the spindle 20 will be effected, thereby automatically decreasing the tension in the wire again. The action is such that a balance is had, by which a substantially constant tension is maintained in the wire, the value of this being governed by the extent of inclination of the track and housing structure 58, 60 with respect to the horizontal. The more that the track and housing are inclined, the greater will be the force component exerted by gravity on the dancer pulley assemblage 48 which tends to sift the latter downward along the track, and in consequence the tension of the wire will be correspondingly increased, said increase varying with the sine of the angle which the track makes with the horizontal. Because of the governing of the wire speed by the constant speed capstan 84, the control of the speed of the spindle 20 will be such that the dancer pulley assemblage 48 is always at an intermediate position on the track 58 whereby it may move either to a higher or a lower position. If the wire tension increases with buildup of the wire on the spool, this will move the assemblage 48 to a higher position, resulting in a lesser spindle speed and an automatic decrease in tension, and vice versa.

Considering FIGS. 1 and 13, the control of the spindle motor 18 by the potentiometer 38 is such that when the dancer pulley assemblage 48 is at its right-most position, virtually against the sheave assemblage 80, the motor 18 will be at a standstill, and any movement of the assemblage 48 to the left will apply a small starting voltage to the motor.

In conjunction with the automatic tension control as provided above, whereby fine wire of relatively small tensile strength may be wound in large quantities on a spool or bobbin at relatively high speeds, the invention further provides an improved traverse device by which the wound wire is smoothly laid on the spool and prevented from bunching at certain points or locations, which bunching would effect undesirable momentary increases in the wire tension and tend to defeat the purpose of the inclined dancer construction.

The smooth or uniform laying on the wire is effected by a traverse organization depicted in FIGS. 6 through 10. Referring to FIG. 9 there is provided a traverse pulley 96, carried by a spindle 98 mounted on an arm 100 which is carried at the outer extremity of a traverse bar 102 longitudinally movable in antifriction ball bushings 104 disposed within the machine casing 10. The inner end of the bar 102 is affixed to a carriage 106 which is reciprocated by a power-driven screw 108 engaged with a bushing-nut 110 mounted on the carriage. The bushing 110 may also be of the anti-friction ball type, and the screw 108 may be correspondingly formed to accommodate anti-friction balls. It will be understood that by such organization, reverse turning of the screw 108 will result in reciprocative movements of the traverse bar 102 and the traverse pulley 96 whereby the wire 83 passing over the latter will be guided to the spool 30 so as to be placed thereon in layers.

The reverse turning of the drive screw 108 is effected by a pair of oppositely driven electric or magnetic clutches 112 and 114, said clutches having parts 116 and 118 driven by oppositely turning, cooperable meshing spur gears 120 and 122. The spur gear 120 is on a shaft 124 carrying a pulley 126 over which a belt 128 passes, such belt being in turn driven by a small pulley 130 of a speed change device 132 (see FIGS. 1 and 2). The speed change device 132 has a drive shaft 134 which is coupled to the spindle 20 so as to turn therewith. Accordingly it will be seen that the drive-screw 108 is powered from the spindle 20 to turn concurrently therewith, power being supplied initially by the motor 18.

The magnetic clutch 114 is coupled to a shaft 134 extending parallel to the drive screw 108, said shaft having a sprocket 136 driving, by means of a chain 138, a sprocket 140 carried by the drive screw 108. The magnetic clutches 112 and 114 are always energized alternately, whereby either one or the other is effective in driving. Since the spur gears 120, 122 turn in opposite directions, this will result in either one or the other of the clutches turning in opposite directions whereby either the shaft 134 or the screw 108 will be driven by a clutch. The shaft 134 always turns in the same direction as the screw 108 by virtue of the sprocket and chain drive 136, 138 and 140. Accordingly, both the shaft 134 and the screw 108 will turn as a unit, either in one direction or the other, depending on which of the clutches 112, 114 is energized. The reverse turning of the screw 108 is thus effected, and the reciprocative movement of the traverse bar 102 and traverse pulley 96.

According to the present invention, the extent of the traversing movement of the traverse bar 102 and pulley 96 is automatically continually increased as the wire builds up in diameter on the spool 30. The extent of travel of the traverse is effected by a novel follower device, which wire may be laid on spools evenly and substantially in layers where such spools have tapered or conical ends as shown in FIG. 2, see the spool 30. The follower device effects a change in a condition in response to increases in the outer diameter of the quantity of wire which is being wound up on the spool.

Such follower device, in the illustrated embodiment of the invention, comprises a roller 146 (see FIGS. 1 and 6) turnably carried by a yoke 148 mounted on a slide bar 150 in such a position that the roller 146 will engage the outermost layers of the wire being wound on the spool 30. The slide bar 150 is longitudinally movable in a ball bushing 152 by which friction is reduced, said bushing being carried by a suitable bracket structure 154 affixed to the front wall 28 of the machine case. The bracket 154 includes upper and lower carrier walls 156 and 158, and the slide bar 150 has cross bolts 160 and 162 passing through slots 164 and 166 in the walls 156 and 158. Spacer bushings or sleeves 168 are provided on the bolts 160, 162, and the latter carry upper and lower cam plates 170 and 172, disposed respectively above and below the slotted walls 156 and 158 of the bracket structure 154. The bushings 168 have a close driving fit in the slots 164, 166 whereby these constitute guides for preventing the slide bar 150 from turning.

It will be seen that by the above organization as the wire builds up on the spool 30 the roller 146 in following such wire will shift or retract the slide bar 150 with a left-to-right movement as seen in FIG. 1 or a downward movement as viewed in FIG. 6, whereby the cam plates 170, 172 will be correspondingly shifted. The plates 170, 172 have sloping cam edges 174 and 176 respectively, such edges being engageable with cam follower rollers 178, 180 respectively, carried by slide bars 182 and 184 respectively. The bars 182, 184 (see FIG. 7) are carried in anti-friction ball bushings 186 and 188 disposed within the machine case 10. Secured to the slide bars 182 and 184 are limit members 190 and 192 respectively, such members mounting electrical limit switches 194 and 196 having roller-carrying plungers 198 and 200, respectively. An extension helical spring 202 is connected to the limit member 192, said spring passing through a bore 204 in a bearing support 206 and being connected with a cable 208 passing over a roller 210 disposed in a recess 212 in the bearing support 214. The cable 208 is connected with the limit member 190, and a spring 215 and cable 217 connected between the support 214 and the limit member 192 bias the latter to the left; by such organization the limit members 190, 192 and the bars 182 and 184 respectively carrying the same, together with the cam follower rollers 178 and 180 are continually urged to the left as seen in FIGS. 6 and 7, thereby maintaining the follower rollers in engagement with the sloping edges 174 and 176 respectively of the cam plates 170, 172.

Referring to FIG. 7, the limit members 190, 192 have ball bushings 216 and 218 respectively, providing anti-friction bearings on the slide bars 182, 184.

Referring to FIG. 10, the carriage 106 of the traverse mechanism has a depending arm 220 provided with oppositely directed switch actuator members 222 and 224 which are respectively engageable with the limit switch plungers 198 and 200 as the carriage 106 is reciprocated. The limit switches 194, 196 are connected respectively with the magnetic clutches 112, 114 to control the energizations thereof, the arrangement being such that whenever any one of the said switches is actuated it results in de-energization of one clutch and energization of the other clutch. This reverses the movement of the traverse mechanism, and as the other limit switch is actuated it de-energizes the clutch which is thus previously energized and now energizes the clutch which was previously de-energized. The circuitry involving this action of the limit switches is considered to be well within the purview of one skilled in the art, and since such circuitry is well known and not considered novel it is not shown herein in great detail. One simplified circuit arrangement for effecting the alternate energization of the clutches is given in FIG. 14, wherein notched, staggered wheels 230, 232 are advanced with a stepped movement by a ratchet wheel 234 actuated by a solenoid 236 which is periodically energized by closing of the limit switches 198, 200. The notched wheels 230, 232 alternately close and open switches 238 and 240 which control the energization of the clutches 112, 114.

It will now be understood from the foregoing that the retracting movement of the slide bar 150 as effected by a buildup of wire on the spool 30 will actuate the cams 170, 172 so as to cause a right-to-left movement of the slide bar 182 and a left-to-right movement of the slide bar 184, as seen in FIGS. 6 and 7. This will effect a separating movement of the limit switches 194, 196 whereupon there will be required a greater travel of the traverse bar 102 and pulley 96 to effect actuation of the switches. Accordingly, the build-up of wire on the spool 30 will automatically increase the extent of traversing movement of the traverse pulley 96, thereby to compensate for the sloping ends of the spool. Preferably the arrangement is such that as each layer of wire is wound on the spool 30 the roller 146 will be shifted backward by one diameter of the wire so as to move the cam plates 170, 172 to shift each limit switch by an amount equal to one wire diameter. Thus, for each cycle of operation or complete reciprocation of the traverse, the extent of travel will be increased by two diameters of the wire. In actual practice, it is not necessary for this theoretical movement of the traverse to be exactly carried out. Instead, a summation of increments may prevail, by which a general increase in the extent of the movement of the traverse will occur by which there will be properly taken care of the sloping ends of the spool 30.

Adjustment of the cam plates 170, 172 may be effected by the provision of slots 244 provided in the plates, as seen in FIG. 6. This enables an angular adjustment of the plates to be had. The upper cam plate 170 may carry a switch actuator member 246, adjustable by means of a slot 248 in the plate, such member being engageable with the plunger 250 of a limit switch 252 by which the machine is shut down upon the spool 30 becoming fully wound with wire. Such latter circumstance will, it will be readily understood, fully retract the slide bar 150 whereby the switch actuator 246 is engaged with the switch plunger 250 for the purpose specified.

By varying the input-to-output speed ratio of the speed changer 132, the machine is adjusted for spooling wire of different sizes or diameters.

In accordance with the present invention, for the purpose of enabling fine wire of relatively small tensile strength to be started on the bobbin 30 and brought up to the desired high linear speed, there is provided a novel capstan control device by which driving torque may be applied gradually and smoothly increased until the full driving speed of the capstan is had.

Referring to FIGS. 11 and 12, such control device comprises a novel magnetic clutch mechanism designated generally by the numeral 256, such mechanism being connected to the spindle 258 on which the capstan 84 is carried. The clutch mechanism 256 is driven through a suitable gear unit 260 from an electric motor 262 located on top of the machine casing 10.

The novel clutch mechanism 256 comprises a rotary driving member 264 adapted to engage a rotary driven clutch plate 266. The clutch plate 266 is constituted of magnetic material such as cast iron, and is provided with a polished chromium-plated surface 268 in order to reduce the driving friction between the plate 266 and the member 264.

Further, in accordance with the invention, the clutch plate 266 is yieldably mounted on the shaft 258 whereby it may readily align itself with the driving part 264. The yieldable mounting comprises a resilient ring 270 carried by a plastic (nylon) bushing 272, in turn mounted on a lubricant-impregnated bearing (Oilite) collar 274 which is secured to the shaft 258. The yieldable mounting further comprises a rotary plate 276 having driving pins 278 provided with resilient annular facings in the form of O-rings 280, the projecting portions of the pins 278 and the facings 280 being disposed in holes 282 provided in the clutch plate 266. A resilient sponge separator or backing member 284 separates the clutch plate 266 from the clutch plate 276, and the latter is rigidly secured to the capstan shaft 258.

It will be understood that by such organization the clutch plate 266 is resiliently or floatably mounted with respect to the shaft 258, and may readily align itself with the driving part 264. This organization, in conjunction with the smooth chromium-plated friction-reducing surface 268 provided on the clutch plate 266 results in an extremely smooth-acting clutch by which torque may be applied to the capstan shaft 258 without vibration, chattering and the like, and instead in a manner to provide an extremely smooth, increasing driving force by which there is minimized any tendency for sudden, excessive forces being applied to the fine wire which would result in breakage of the same. As shown in FIG. 12, the clutch parts 264 and 266 may be at all times engaged, even when the clutch is not energized, thereby to effect a "drag" whereby the capstan 84 turns, when free of wire, for the unenergized condition of the clutch. Such turning may be halted by hand pressure, due to the polished surface 268, and is desired in the present case as will be later brought out.

In starting the machine, the capstan motor 262 is energized, the clutch 256 de-energized, with the capstan 84 turning freely or idly. The capstan is stopped by hand, and the wire 83 passed over it and thence over the dancer construction 46 as indicated in FIG. 1 but with the pulley assemblage 48 in right-most position, close to the sheaves 80 whereby the spindle motor 18 is at a standstill. The wire 83 is now brought over the traverse pulley 85 and then secured to the spool 30, with the wire kept taut and the pulley assemblage 48 maintained in right-most position. This latter may be effected wholly by the taut wire. Upon completion of the fastening of the wire to the spool, during which some slack in the wire is taken up by the hand, this slack is now let out, permitting the pulley assemblage 48 to shift to the left slightly. This places a small voltage on the spindle-driving motor 18, causing slow turning of the spindle. Due to the tendency for the capstan 84 to turn the wire 83 will now begin spooling slowly. At this point the capstan clutch 256 is given slight energization, and the energization is slowly increased to gradually increase the wire speed, as the spindle 20 is slowly rotated under the driving action of the motor 18 at the reduced energization. When the capstan speeds up, the pulley assemblage 48 shifts to the left, increasing the speed of the motor 18. In this manner the wire speed is gradually increased while the wire is kept taut in the dancer structure, with the dancer track disposed at an inclination to the horizontal. As the speed of the wire increases the control of the power of the spindle driving motor 18 will be continued by the potentiometer 38, until finally the wire speed reaches its maximum, as determined by full energization of the capstan driving clutch 256 and attainment by the capstan of its maximum speed.

In accordance with the method provided by the invention, the wire spooling is accomplished by steps which include the moving of a follower or control member in response to build-up in the diameter of the quantity of wire which is wound on the spool, the shifting apart of two limit members in accordance with the extent of movement of the follower or control member, the reciprocating of a traverse device which guides the wire onto the spool, and the increasing of the path of reciprocating movement of the traverse device in accordance with the extent of shifting of the limit members. The method further includes actuating switch devices as the traverse overtakes the limit members during such shifting and reciprocating movement, and the reversing of the traverse movement in response to the actuation of said switch devices.

The invention also embraces the method for maintaining a desired light constant tension in the wire, which includes the steps of passing the wire to be spooled around a dancer pulley assemblage which is movable along a track, and inclining the track from the vertical about a horizontal axis by an amount to obtain the desired light tension. The method further includes the step of passing the wire from the dancer pulley assemblage around a sheave having an axis which coincides with the axis of the pivotal track carrying the dancer pulley assemblage.

A modified form of dancer construction, having a centralized pivot substantially through or below the center of gravity, by which a weight balance is effected between two portions of the track assemblage, is illustrated in FIGS. 15 and 16. These figures also discloses an indicator device, by which the extent or degree of inclination of the dancer construction may be shown. With such balanced construction the adjustment of inclination of the dancer may be quickly and conveniently effected, and, with less effort.

As shown, the dancer construction comprises an elongate housing and track, the housing being designated 290 and having a front opening or slot 292 in which a dancer pulley assemblage 296 travels. The dancer pulley assemblage 296 has a horizontal spindle 298 connected with a chain 300 which passes over sprockets 302 and 304, carried respectively by upright spindles 306 and 308. The lower portion of the spindle 306 may connect with a control potentiometer 310 similar to the potentiometer 38 illustrated in FIGS. 1–3, 5 and 13, and by which the spindle driving motor 18 is controlled as to its speed. The dancer construction also includes a sheave assemblage 312 having a horizontal spindle 314.

The pulley assemblage 296 has a carriage 316 provided with a ball bearing roller 318 engageable with track surfaces 320 and 322 provided in the housing 290, and provided with a ball bushing 324 which rides over a track bar 326.

By the present invention the housing 290 is pivotally supported substantially at its mid point or under the center of gravity, such housing having a pivot bearing block 328 carried by a post 330 mounted on the front of the machine. The pivot block 328 has a cut 332 in it, and comprises a friction lock in conjunction with a clamping hand screw 334 by which the block may be clamped to the pivot post 330. On the post 330 there is affixed a dial 336 which is referrable to an index mark 338 on the housing 290. The dial 336 may be calibrated in any desired units, as for example degrees of inclination from the horizontal, as shown.

It will now be understood that by loosening the clamping screw 334 the dancer construction including the housing 290 may be pivotally shifted so that it can occupy a desired inclination. Tightening of the screw will secure the dancer construction in the adjusted inclination, and the dial 336 will indicate the extent of such inclination.

With the dancer construction illustrated in FIGS. 15 and 16, the dancer pulley assemblage 296 acts in a reverse direction, as compared with the assemblage 48 illustrated in FIGS. 1 and 3. When the pulley assemblage 296 is in the rightmost position shown, the motor 18 has the fastest speed, and if such assemblage should be shifted from right-to-left to the leftmost position, the motor 18 will be at a standstill, with virtually no voltage applied to it. Threading of the wire proceeds from the prime capstan first to the sheave assemblage 312, and after passing over the pulley and sheave assemblages, leaves the assemblage 312 for the traverse pulley.

The operation of the dancer construction of FIGS. 15 and 16 is otherwise the same as that already described in connection with FIGS. 1–3, except that because of the balanced pivotal mounting, of the housing 290, the forces due to gravity, acting during adjustment of the dancer construction, are balanced whereby there is less weight to be handled, making for an easier adjustment. Also, a handy visual indication is had of the extent of inclination.

A modified form of automatic traverse mechanism as provided by the invention is illustrated in FIG. 17. This modified form of control may be utilized to replace the cam type control illustrated in FIGS. 6 and 7. In FIG. 17 there is shown a follower roller 146a which is arranged to engage the wire which is being wound on the spool 30. The roller 146a is carried by a slide bar 150a, the latter being connected to a master piston 340 movable in a master cylinder 342. Within the cylinder 342 is hydraulic fluid, the cylinder being filled through a filler line or tube 344 having a valve 346. After all of the air has been excluded from the hydraulic system illustrated in FIG. 17, the valve 346 is closed, thereby to prevent further ingress of air and to effect a closed hydraulic system.

The master cylinder 342 is connected by a hydraulic line 348 to a first slave cylinder and piston 350, 352 respectively, said slave cylinder and piston constituting an actuator for a limit switch 194a which is connected with the piston 352 for movement therewith. A second slave cylinder and piston 354, 356 is also provided, the piston 356 being connected to a limit switch 196a. The switches 194a and 196a have roller-plungers 198a and 200a respectively, the said plungers being adapted for actuation by actuator members similar to the members 222 and 224 shown in FIG. 10.

The master cylinder and piston 342, 340, together with the slave cylinders and pistons 350, 352 and 354, 356 are hereinafter also referred to as hydraulic motive units. From the cylinder 350 a hydraulic line 360 connects to the cylinder 354 whereby the latter is directly powered or actuated in response to operation of the first slave piston 352.

As the follower roller 146a is advanced (in a downward direction as viewed in FIG. 17) the piston 340 will be advanced into the cylinder 342, forcing hydraulic fluid through the line 348 into the cylinder 350 whereby the piston 352 and the limit switch 194a will be shifted to the left. Such movement also will cause hydraulic fluid from the left portion of the cylinder 350 through the line 360 and into the left portion of the second slave cylinder 354 whereby the second slave piston 356 will be shifted to the right, together with the limit switch 196a. Thus, there is effected by hydraulic means an automatic shifting or separation of the limit switches 194a and 196a, to accomplish the same purpose as the separation effected between the limit switches 194 and 196 described above and illustrated in FIG. 17. However, with the organization shown in FIG. 17 there is the added advantage of a desirable flexibility as regards the location and disposition of the various components making up the control. With the control device of FIGS. 6 and 7, a limitation is imposed on the disposition of the limit switches 194 and 196, with respect to the spool 30 on which the wire is being wound. By use of the organization of FIG. 17 the limit switches 194a and 196a may be located at more remote points, without regard to the specific location of the spool 30 and the follower roller 146a. Under certain circumstances this may constitute a distinct advantage.

It will now be understood from the foregoing that I have provided a novel and improved apparatus and method whereby extremely fine wire of low tensile strength may be spooled or wound at high speeds on relatively large spools adapted to hold an appreciably large quantity of wire. The tension in the wire being spooled may be readily adjusted by changing the inclination of the track of the dancer pulley assemblage, and such tension may be extremely light and not limited by the weight of the dancer pulley assemblage, by virtue of the angularity of the track therefor with respect to the horizontal. The tension will be automatically maintained at the desired value and will be uniform regardless of the build-up of the wire on the spool 30. As the wire builds up, the extent of movement of the traverse pulley will be automatically increased to take care of the sloping ends of the spool. Lumping of the spooled wire will be avoided, thereby preventing any sudden, uncompensated changes in wire tension which might result in breakage of the wire. Smooth application of driving torque to the capstan of the machine is obtained by the improved magnetic clutch assemblage, by which fine wire of relatively low tensile strength may be safely brought up to full winding speed. The machine is seen to be relatively simple in its construction, and to require relatively few components whereby it may be economically fabricated and produced.

Variations and modifications may be made within the scope of the claims, and portions of the improvements may be used without others.

I claim:

1. In a wire spooling machine, a spindle adapted to carry a spool on which wire is to be wound; adjustable-speed means for turning the spindle; means for guiding wire from a source of supply to the spool, said means including a dancer pulley assemblage of predetermined weight, over which the wire passes and including a track along which the assemblage can move; means responsive to movement of the dancer pulley assemblage along the track, for changing the speed of the spindle; and means mounting the track about a pivotal axis for adjustable positioning thereof to effect different inclinations, thereby to alter the effect of gravity on the dancer pulley assemblage and enable the winding of wire under different tensions.

2. A wire spooling machine as in claim 1, wherein the wire guide means includes a set of sheaves spaced from and cooperable with the dancer pulley assemblage, said sheaves and pulley assemblage having substantially parallel axes, and the pivotal axis of said track coinciding with the axis of the sheaves.

3. A machine as in claim 1, wherein the wire tension varies substantially as the sine of the angle which the track makes with the horizontal.

4. A machine as in claim 1, wherein there are antifriction ball bearing means for mounting the dancer assemblage for movement along the track.

5. A machine as in claim 1, wherein there is a slotted arm connected to said track, and an adjustment bolt passing through the slot of the arm to fix the same and the track in various adjusted positions.

6. A machine as in claim 1, wherein the means for changing the spindle speed includes a pair of spaced sprockets and a chain passing around the same, and includes an electrical control device drivingly connected to one sprocket, said dancer assemblage being connected to one portion of the chain whereby the shifting movement thereof effects a turning of the sprockets and adjustment of the electrical control device.

7. A machine as in claim 6, wherein there is a casing in which the track sprockets and chain are disposed and on which the control device is mounted, said casing shifting with the track about the pivotal axis of the latter, and wherein there is a slotted arm joined to the casing, and an adjustment bolt passing through the slot of the arm to fix the same and the track in various adjusted positions.

8. In a wire spooling machine, mechanism for winding wire on a spool having at least one tapered end, comprising a follower device effecting a change in a condition in response to increases in the outer diameter of the quantity of wire wound on the spool; a reciprocable traverse for guiding wire to the spool; means for reciprocating said traverse; and means controlled by the follower device and responsive to said change in condition, for effecting an increase in the travel of the traverse as the diameter of the said quantity of spooled wire increases.

9. In a wire spooling machine, mechanism for winding wire on a spool having at least one tapered end, comprising a movably mounted follower member adapted to engage the outer wires of a quantity of wire wound on the spool and to be shifted thereby as the diameter of the said quantity increases; a reciprocable traverse for guiding wire to the spool; means for reciprocating said traverse; and means controlled by the follower member and responsive to shifting thereof as the wound wire builds up on the spool, for effecting an increase in the travel of the traverse.

10. A winding mechanism as in claim 9, wherein the means for reciprocating the traverse includes a carriage and guide means providing for straight line motion thereof, includes a drive screw engaged with the carriage, includes a reversing mechanism comprising reverse gears and electric clutches associated respectively with the gears, for turning the screw in either the forward or the reverse direction, and includes electric switch and actuator means automatically controlled by the carriage during reciprocation of the same for alternately energizing the clutches, and wherein the means for effecting increased travel of the traverse includes a control device acting on said switch and actuator means.

11. A mechanism as in claim 10, wherein one electric clutch is directly connected to the traverse drive screw and wherein there is a chain drive connecting the other electric clutch to the drive screw.

12. A mechanism as in claim 10, wherein the switch and actuator means includes an actuator device on the carriage and a pair of electric switches cooperable with the actuator device, wherein the control device includes slides mounting the said switches for movement toward and away from said actuator device, and further includes cam devices for shifting said slides and switches in opposite directions in response to movement of the said follower member as a consequence of the build-up of wire on the spool.

13. A mechanism as in claim 12, wherein the slides include parallel, longitudinally movable spaced bars having rollers at adjoining ends, wherein the cam devices comprise spaced parallel plates having sloping edges engaged with said rollers, said plates being movable in a direction at right angles to the axes of the bars and being drivingly connected to the said follower member.

14. A mechanism as in claim 10, wherein the switch and actuator means includes an actuator device on the carriage and a pair of electric switches cooperable with the actuator device, wherein the control device includes slides mounting the said switches for movement toward and away from said actuator device, and further includes hydraulic motive units for shifting said slides and switches in opposite directions in response to movement of the said follower member as a consequence of the build-up of wire on the spool.

15. A mechanism as in claim 14, wherein the motive units comprise a master cylinder and piston actuated by the follower member, and comprise first and second slave cylinders and pistons controlled by the master cylinder and piston and connected respectively to the said slides.

16. A mechanism as in claim 15, wherein the second slave cylinder and piston receives power directly from the first slave cylinder and piston.

17. The method of spooling wire on a spool having tapered ends, which includes the steps of moving a control member in response to build-up of the diameter of the quantity of wire wound on the spool; shifting two limit members apart in accordance with the extent of movement of the control member; reciprocating a traverse device which guides wire onto the spool; increasing the path of reciprocating movement of the traverse device in accordance with the extent of shifting of the limit members.

18. The method of spooling wire on a spool having tapered ends, which includes the steps of moving a control member in response to build-up of the diameter of the quantity of wire wound on the spool; shifting two limit members apart in accordance with the extent of movement of the control member; reciprocating a traverse device which guides wire onto the spool at a rate and in directions to overtake the separating limit members; actuating switch devices as the traverse overtakes the limit members during the said shifting and reciprocating; and reversing the traverse movements in response to actuation of said switch devices.

19. A wire spooling machine as in claim 1, wherein the track is of appreciable length, and wherein the pivotal axis of the track is substantially at the mid point thereof.

20. A wire spooling machine as in claim 19, wherein there is an indicator device, comprising a dial and pointer, connected with the track to indicate the extent of said inclination.

21. A wire spooling machine as in claim 1, wherein the track is elongate and wherein the pivotal axis of the track is adjacent its center of gravity, considering the track length.

22. A wire spooling machine as in claim 21, wherein the means mounting the track comprises a friction lock, and manual means for actuating said lock.

23. A wire spooling machine as in claim 1, wherein there is an indicator device for indicating the extent of inclination of the track.

24. The method of spooling very light gauge wire on a spool to obtain fine control of a desired very light constant tension in the wire leading to the spool, which includes the steps of first passing the wire to be spooled from and to one given location respectively to and from, and around a dancer pulley assemblage which is located at another location and is movable along a track in directions toward and away from the said one location, said dancer pulley assemblage being connected to an elongate control element and having a weight which, if directly borne by the wire passing around it, would effect an excessive tension in said wire, supporting the dancer assemblage on rolling elements engaged with said track, power feeding the wire to the dancer assemblage at a controlled rate, removing the wire from the dancer assemblage at a controlled rate, and inclining the track and elongate control element more or less from the horizontal and about a fixed pivotal axis by an amount changing the gravity component of force on the assemblage to a value which provides the desired light tension while the wire is in motion.

25. The method of claim 24, wherein there is the additional steps of passing the wire from the dancer pulley assemblage around a sheave which is located at said one given location and which has an axis coinciding with the pivotal axis of the track.

26. The method of spooling wire on a spool having tapered ends, which includes the steps of moving a control member simultaneously with build-up of the diameter of the quantity of wire wound on the spool; shifting two limit members apart in accordance with the extent of movement of the control member; reciprocating a traverse device which guides wire onto the spool; and increasing the path of reciprocating movement of the traverse device in accordance with the extent of shifting of the limit members.

References Cited in the file of this patent

UNITED STATES PATENTS

| | | |
|---|---|---|
| 1,342,270 | Walker | June 1, 1920 |
| 2,155,211 | Zarafu | Apr. 18, 1939 |
| 2,255,935 | Lewellen et al. | Sept. 16, 1941 |
| 2,522,622 | Laurant | Sept. 19, 1950 |
| 2,706,091 | Nelson | Apr. 12, 1955 |
| 2,845,229 | Bliss | July 29, 1958 |
| 2,883,120 | Foster et al. | Apr. 21, 1959 |